US009280708B2

(12) United States Patent
Grassel et al.

(10) Patent No.: US 9,280,708 B2
(45) Date of Patent: Mar. 8, 2016

(54) METHOD AND APPARATUS FOR PROVIDING COLLABORATIVE RECOGNITION USING MEDIA SEGMENTS

(75) Inventors: Guido Peter Grassel, Espoo (FI); Kongqiao Wang, Beijing (CN); Arto Juhani Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 180 days.

(21) Appl. No.: 13/307,472

(22) Filed: Nov. 30, 2011

(65) Prior Publication Data
US 2013/0136316 A1 May 30, 2013

(51) Int. Cl.
*G06K 9/00* (2006.01)
*G06Q 50/00* (2012.01)
*G06F 15/16* (2006.01)

(52) U.S. Cl.
CPC ............ *G06K 9/00677* (2013.01); *G06Q 50/01* (2013.01); *G06F 15/16* (2013.01); *G06K 9/00221* (2013.01); *G06K 9/00228* (2013.01)

(58) Field of Classification Search
CPC ........... G06K 9/00288; G06K 9/00221; G06F 15/16; G06Q 50/01
See application file for complete search history.

(56) References Cited

U.S. PATENT DOCUMENTS

| 2005/0165795 | A1 | 7/2005 | Myka et al. | |
|---|---|---|---|---|
| 2006/0171603 | A1* | 8/2006 | Jung et al. | 382/254 |
| 2008/0201327 | A1* | 8/2008 | Seth | 707/5 |
| 2008/0219589 | A1* | 9/2008 | Jung et al. | 382/276 |
| 2009/0060289 | A1 | 3/2009 | Shah et al. | |
| 2010/0088726 | A1 | 4/2010 | Curtis et al. | |
| 2010/0125451 | A1* | 5/2010 | Napper et al. | 704/9 |
| 2010/0216441 | A1* | 8/2010 | Larsson et al. | 455/415 |
| 2011/0013810 | A1* | 1/2011 | Engstrom et al. | 382/118 |

(Continued)

FOREIGN PATENT DOCUMENTS

EP          0 944 019 A2    9/1999
KR    10-2010-0107507 A    10/2010

(Continued)

OTHER PUBLICATIONS

Choi, K., Byun, H., and Toh, K., A Collaborative Face Recognition Framework on a Social Network Platform, 2008, 8th IEEE International Conference on Automatic Face and Gesture Recognition, pp. 1-6.*

(Continued)

*Primary Examiner* — Stephen R Koziol
*Assistant Examiner* — Jonathan S Lee
(74) *Attorney, Agent, or Firm* — Ditthavong & Steiner, P.C.

(57) ABSTRACT

An approach is provided for providing collaborative recognition using media segments. The recognition platform causes, at least in part, a generation of a request to determine recognition information for one or more media items associated with a device, one or more segments of the one or more media items, or a combination thereof. Next, the recognition platform determines to transmit the request to one or more other devices based, at least in part, on one or more device selection criteria. Then, the recognition platform receives the recognition information in response to the request. Further, the recognition platform processes and/or facilitates a processing of the recognition information to determine one or more identities of one or more users, one or more objects, or a combination thereof represented in the one or more media items.

20 Claims, 12 Drawing Sheets

(56) References Cited

U.S. PATENT DOCUMENTS

| | | | |
|---|---|---|---|
| 2011/0026781 A1 | 2/2011 | Osadchy et al. | |
| 2011/0038512 A1* | 2/2011 | Petrou et al. | 382/118 |
| 2011/0044512 A1* | 2/2011 | Bambha et al. | 382/118 |
| 2011/0047384 A1* | 2/2011 | Jacobs et al. | 713/176 |
| 2012/0314916 A1* | 12/2012 | Rothschild | 382/118 |
| 2012/0321143 A1* | 12/2012 | Krupka | G06K 9/00677 382/118 |
| 2013/0033611 A1* | 2/2013 | Chen | 348/207.1 |
| 2013/0077833 A1* | 3/2013 | Kritt et al. | 382/118 |
| 2013/0121540 A1* | 5/2013 | Garcia et al. | 382/118 |
| 2013/0262588 A1* | 10/2013 | Barak et al. | 709/204 |

FOREIGN PATENT DOCUMENTS

| | | |
|---|---|---|
| WO | WO 01/38356 A2 | 5/2001 |
| WO | 2008156473 A2 | 12/2008 |
| WO | WO 2010/149855 A1 | 12/2010 |
| WO | WO 2011/007216 A1 | 1/2011 |
| WO | WO 2011/017653 A1 | 2/2011 |

OTHER PUBLICATIONS

J. Y. Choi et al., "Collaborative Face Recognition for Improved Face Annotation in Personal Photo Collections Shared on Online Social Networks", Publication Date: Feb. 2011, pp. 14-28, <http://ieeexplore.ieee.org/stamp/stamp.jsp?arnumber=5601785 >.

M. Dantone et al., "Augmented Faces", pp. 1-8, <http://www.vision.ee.ethz.ch/publications/papers/proceedings/eth_biwi_00869.pdf>.

Notification of Transmittal of the International Search Report and the Written Opinion of the International Searching Authority, or the Declaration; International Search Report; Written Opinion; for International Application No. PCT/FI2012/051168, dated May 6, 2013, pp. 1-13.

\* cited by examiner

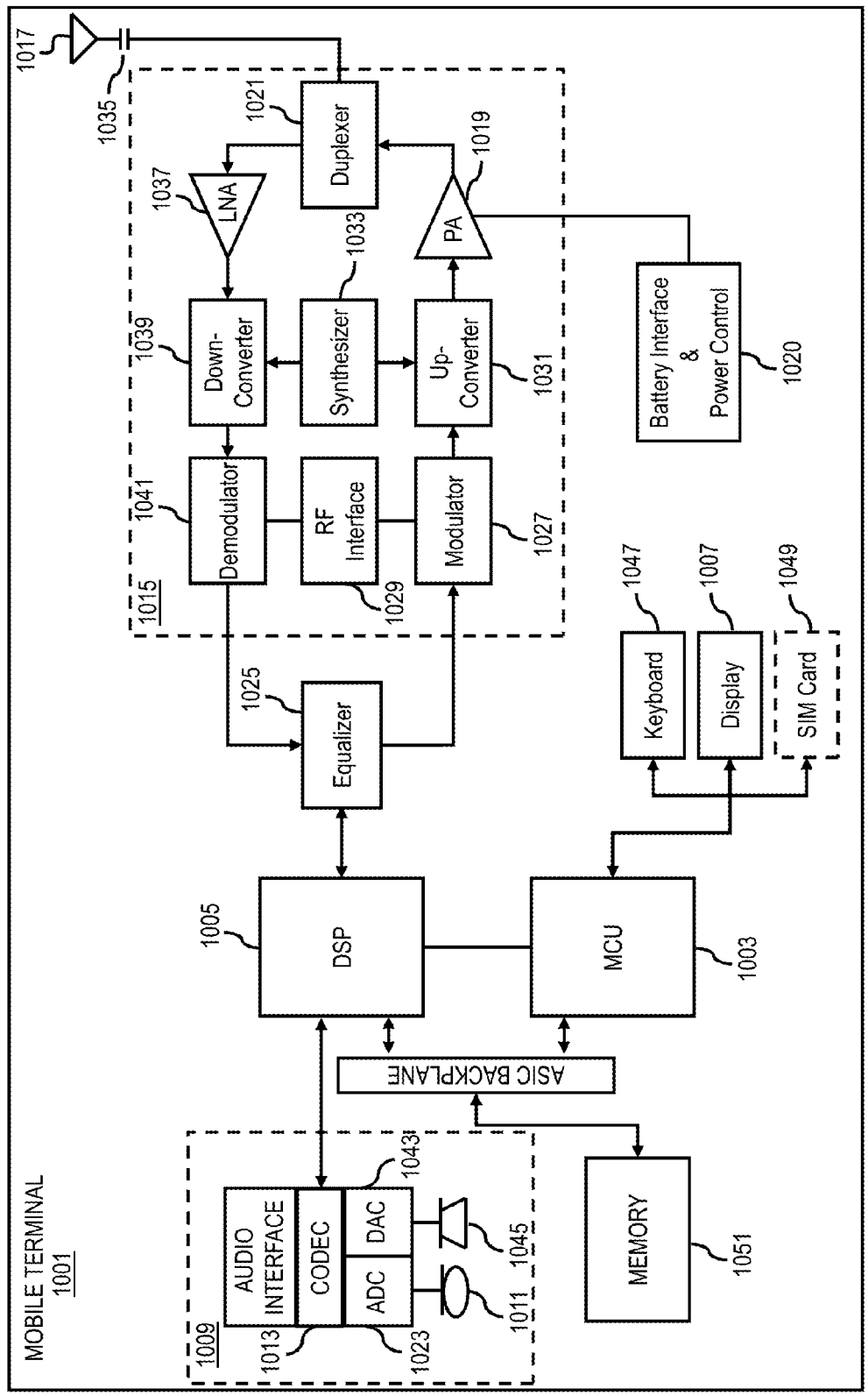

METHOD AND APPARATUS FOR PROVIDING COLLABORATIVE RECOGNITION USING MEDIA SEGMENTS

BACKGROUND

Service providers and device manufacturers (e.g., wireless, cellular, etc.) are continually challenged to deliver value and convenience to consumers by, for example, providing compelling network services. One area of interest has been the development of services and technologies for recognition and distribution with respect to media. For example, in recent years, service providers have provided facial recognition to identify and tag users in photographs. A device may, for instance, upload photographs to a central repository to initiate a comparison of the uploaded photographs against tagged photographs currently stored in the central repository. If a match is found, the uploaded photographs may then be tagged with the names of users determined to be in the uploaded photographs. However, such an approach utilizes a substantial amount of device and network resources. Moreover, because complete photographs are transferred to the central repository for comparison, the approach can raise privacy concerns with respect to the users represented in the photographs.

SOME EXAMPLE EMBODIMENTS

Therefore, there is a need for an approach for providing collaborative recognition using media segments.

According to one embodiment, a method comprises causing, at least in part, a generation of a request to determine recognition information for one or more media items associated with a device, one or more segments of the one or more media items, or a combination thereof. The method also comprises determining to transmit the request to one or more other devices based, at least in part, on one or more device selection criteria. The method further comprises receiving the recognition information in response to the request. The method additionally comprises processing and/or facilitating a processing of the recognition information to determine one or more identities of one or more users, one or more objects, or a combination thereof represented in the one or more media items.

According to another embodiment, an apparatus comprises at least one processor, and at least one memory including computer program code for one or more computer programs, the at least one memory and the computer program code configured to, with the at least one processor, cause, at least in part, the apparatus to generate a request to determine recognition information for one or more media items associated with a device, one or more segments of the one or more media items, or a combination thereof. The apparatus is also caused to determine to transmit the request to one or more other devices based, at least in part, on one or more device selection criteria. The apparatus is further caused to receive the recognition information in response to the request. The apparatus is additionally caused to process and/or facilitate a processing of the recognition information to determine one or more identities of one or more users, one or more objects, or a combination thereof represented in the one or more media items According to another embodiment, a computer-readable storage medium carries one or more sequences of one or more instructions which, when executed by one or more processors, cause, at least in part, an apparatus to generate a request to determine recognition information for one or more media items associated with a device, one or more segments of the one or more media items, or a combination thereof. The apparatus is also caused to determine to transmit the request to one or more other devices based, at least in part, on one or more device selection criteria. The apparatus is further caused to receive the recognition information in response to the request. The apparatus is additionally caused to process and/or facilitate a processing of the recognition information to determine one or more identities of one or more users, one or more objects, or a combination thereof represented in the one or more media items According to another embodiment, an apparatus comprises means for causing, at least in part, a generation of a request to determine recognition information for one or more media items associated with a device, one or more segments of the one or more media items, or a combination thereof. The apparatus also comprises means for determining to transmit the request to one or more other devices based, at least in part, on one or more device selection criteria. The apparatus further comprises means for receiving the recognition information in response to the request. The apparatus additionally comprises means for processing and/or facilitating a processing of the recognition information to determine one or more identities of one or more users, one or more objects, or a combination thereof represented in the one or more media items In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing any of the methods disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a mobile terminal (e.g., handset) that can be used to implement an embodiment of the invention.

DESCRIPTION OF SOME EMBODIMENTS

Examples of a method, apparatus, and computer program for providing collaborative recognition using media segments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
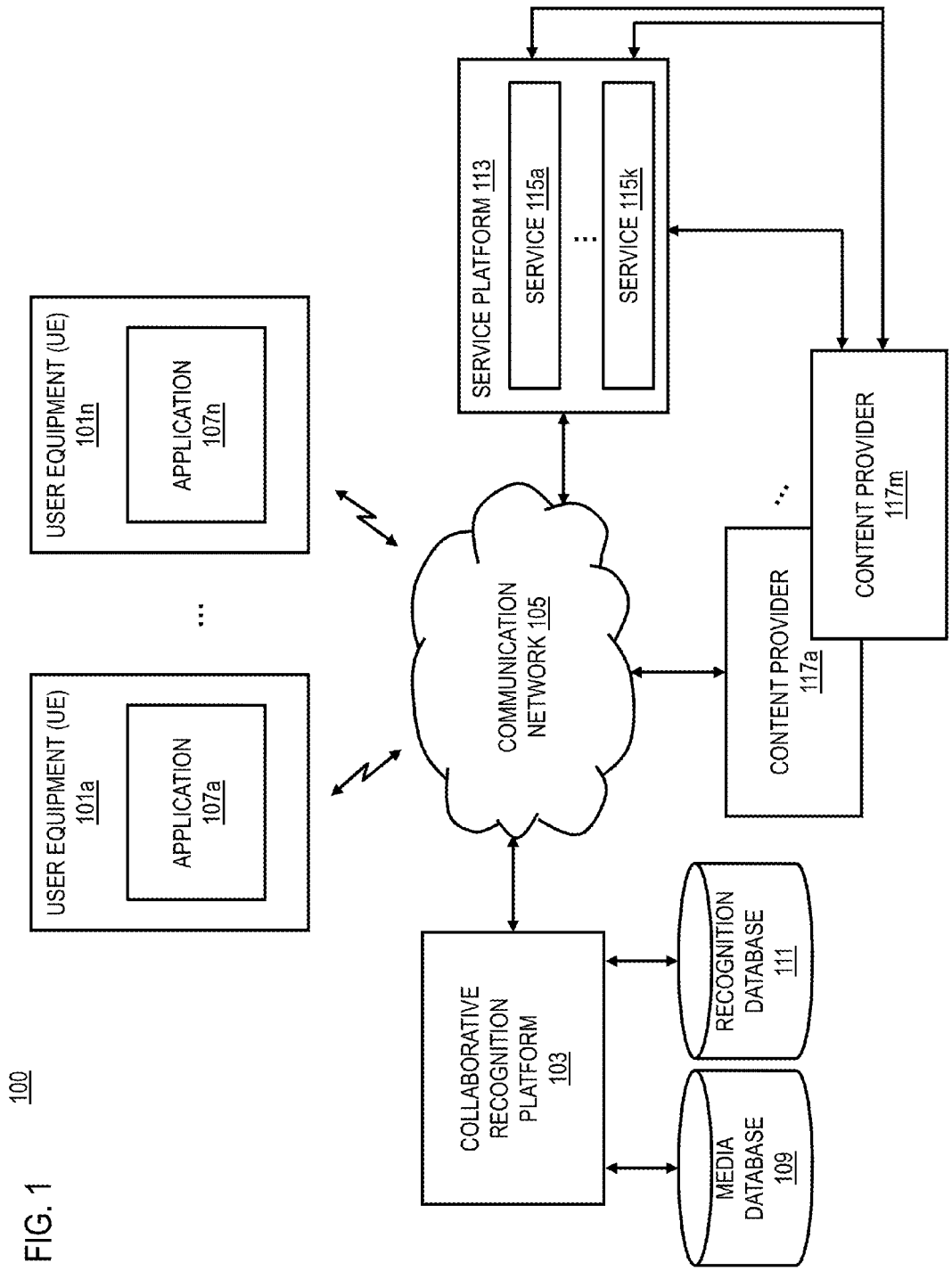
FIG. 1 is a diagram of a system capable of providing collaborative recognition using media segments, according to one embodiment.

FIG. 1 is a diagram of a system capable of providing collaborative recognition using media segments, according to one embodiment. As mentioned, service providers have recently provided facial recognition to identity and tag users represented in photographs, for instance, by using a central repository to perform the facial recognition. For example, a device may upload photographs to a central repository to initiate a comparison of the uploaded photographs against tagged photographs currently stored in the central repository. If a match is found, the uploaded photographs may then be tagged with the names of users determined to be in the uploaded photographs. As discussed, however, a substantial amount of both device and network resources (e.g., processing, memory, network bandwidth, etc.) may be required to perform facial recognition under such an approach. Network bandwidth utilization may, for instance, be considerably high since entire photographs are uploaded to the central repository for comparison. Moreover, because the photographs are generally uploaded in their entirety (and potentially stored) to the central repository, privacy issues may arise with respect to users represented in the uploaded photographs.

To address this problem, a system 100 of FIG. 1 introduces the capability to provide collaborative recognition using media segments. Specifically, the system 100 may generate a request to determine recognition information for media items (as well as segments of the media items) associated with a device. The media items may, for instance, include images, videos, samples, biometric samples, etc., and the recognition information may be determined using facial recognition technology, audio recognition technology, biometric recognition technology, etc. The request may then be transmitted to other devices selected using a number of device selection criteria. The device selection criteria may, for instance, include proximity information, pairing information, social networking information, etc. By way of example, the recognition information may be generated at the selected devices using recognition models available at the respective selected devices. The recognition models may, for instance, be private to the respective selected devices, represent owners of the respective selected devices, etc. The recognition information may then be received, for instance, from the selected devices, in response to the transmitted request. The recognition information may thereafter be processed to determine identities of users and/or objects represented in the media items.

In this way, higher recognition rate and precision may be achieved, as compared to recognition techniques in isolation at a single device (e.g., the capturing device). Because the recognition information from a number of devices can be combined, the chances of accurately determining identities of those represented in media items are increased. In addition, network bandwidth efficiency may be enhanced by sending segments of the media items as part of recognition information requests (e.g., rather than the complete media items), for instance, when network resources are low. Furthermore, privacy of those represented in the media items may also be preserved since the recognition information requests do not necessary need to include the complete media items (e.g., send face patches segmented from images in place of the full images).

In one scenario, a user may use the user's UE 101a (e.g., the user's mobile device) to take a series of photographs of other users at a particular location. The UE 101 may then generate a request that includes face patches segmented from the photographs for determining recognition information for the photographs. While the request is generated, the UEs 101b-101n may, for instance, be selected to receive the request based on a determination that the respective users of the UEs 101b-101n are in a particular social networking group associated with the user of the UE 101a, and the UEs 101b-101n were in close proximity to the UE 101a when the photographs were captured by the UE 101a. As such, the UE 101a may transmit the request with the segments (e.g., face patches segmented from the photographs) to each of the UEs

101*b*-101*n*. Each of the UEs 101*b*-101*n* may then utilize their own recognition models along with the segments to generate recognition information. As indicated, the recognition models may, for instance, be private to the respective UEs 101*b*-101*n* (e.g., not shared with other devices) and include representations of the owners of the respective UEs 101*b*-101*n*. As a result, each of the UEs 101*b*-101*n* may generate recognition information for identifying at least its respective owner if the owner is represented in at least one of the photographs. The UEs 101*b*-101*n* may then transmit the recognition information to the UE 101*a* for processing to determine the identities of the users in the photographs.

In a further scenario, the users of the selected devices (e.g., the UEs 101*b*-101*n*) may have agreed (e.g., via a terms of service agreement) to receive recognition information requests from the system 100 and to process such requests to generate recognition information for the system 100. As such, the generation of the recognition information at the selected devices and the transmission of the recognition information to the system 100 may be background processes of the selected devices. In this way, the users of the selected devices need not be aware of or bothered by the requests for recognition information. Additionally, or alternatively, the background processes related to the generation, the transmission, etc., of the recognition information may be performed when the resources of the selected devices are underutilized or otherwise available.

In another scenario, a networking service (e.g., social networking service, media sharing service, etc.) may receive a video to determine the identities of users in the video. As such, a request for recognition information may be generated to include segments from the video, such as audio samples (e.g., voices), biometric samples (e.g., body shape, facial features, etc.), etc. In this case, the video may contain metadata that provides information with respect to the video's creator along with the context in which the video scenes were shot (e.g., date, time, location, etc., in which the video scenes were captured). The metadata may, for instance, be used to select other devices to receive the request to provide recognition information for the video. As an example, the selected devices may be devices located near the capturing device at the time the video scenes were shot. Upon selection of the devices, the request may be transmitted to the selected devices. In response, the selected devices may generate the recognition information based on the segments included in the request. The selected devices may, for instance, utilize recognition models (e.g., of its respective owners, the owner's social networking friends, etc.) to identify users from the audio samples, the biometric samples, etc., for inclusion in the recognition information. The selected devices may then send the recognition information to the networking service. The networking service may thereafter utilize the collection of the recognition information from all of the selected devices to determine the identities of the users represented in the video. It is noted that the networking service may use the identities to accomplish a number of tasks, such as tagging of the users in the video, distribution of the video to the users, etc. Other tasks may include honoring user privacy settings, for instance, by blurring out the faces of users who have indicated that they do not wish to be recognized in any media item distributed by the networking service. It is also noted that user preferences (e.g., including user privacy settings) may also be used to enhance active notification to the network service, for instance, with respect to a user's location. For example, location information associated with a user who indicates that he/she desires to be recognized in photographs may be transmitted to the networking service (e.g., from the user's device) more frequently than location information associated with users who have not indicated such desire. As such, user preference may affect the amount of client-server communication along with the amount of data (e.g., personally identifiable data) to assist the networking service with recognition.

More specifically, the system 100 may cause, at least in part, a generation of a request to determine recognition information for one or more media items associated with a device, one or more segments of the one or more media items, or a combination thereof. The one or more media items may, for instance, include, at least in part, one or more images, one or more videos, one or more audio samples, one or more biometric samples, or a combination thereof, and the recognition information may be determined based, at least in part, on facial recognition technology, audio recognition technology, biometric recognition technology, or a combination thereof. The system 100 may then determine to transmit the request to one or more other devices based, at least in part, on one or more device selection criteria. As indicated, the one or more device selection criteria may include, at least in part, proximity information, pairing information, social networking information, or a combination thereof. By way of example, the recognition information may be generated at the one or more other devices using one or more recognition models available at respective ones of the one or more other devices. Additionally, the one or more recognition models may be private to the respective ones of the one or more other devices, represent one or more owners of the respective ones of the one or more other devices, or a combination thereof. The system 100 may further receive the recognition information (e.g., from the one or more other devices) in response to the request. As such, the system 100 may process and/or facilitate a processing of the recognition information to determine one or more identities of one or more users, one or more objects, or a combination thereof represented in the one or more media items.

As shown in FIG. 1, the system 100 comprises a user equipment (UE) 101 (or multiple UEs 101*a*-101*n*) having connectivity to a collaborative recognition platform 103 via a communication network 105. The UE 101 may include or have access to an application 107 (e.g., applications 107*a*-107*n*) to enable the UE 101 to interact with, for instance, the collaborative recognition platform 103 to: (1) generate a request to determine recognition information for media items and/or segments of the media items; (2) select other devices to receive the request based on device selection criteria; (3) transmit the request to the selected devices; (4) process recognition information (e.g., received in response to the request) to determine identities of users, objects, etc., represented in the media items; (5) transmit the media items and/or the segments to the selected devices associated with the identities; (6) or perform other functions. The collaborative recognition platform 103 may include or have access to a media database 109 to access or store media items, segments of the media items, or other related information. The collaborative recognition platform 103 may also include or have access to a recognition database 111 to access or store recognition information, recognition models, or other related information. The information of the media database 109 and the recognition database 111 may, for instance, be provided by the UEs 101, a service platform 113, one or more services 115 (or services 115*a*-115*k*), one or more content providers 117 (or content providers 117*a*-117*m*), and/or other services available over the communication network 105. For example, a particular service 115 may obtain content (e.g., media content) from a particular content provider 117 to offer the content to the UE 101. It is noted that the collaborative recognition platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the collaborative recognition platform 103 may cause a transmission of the one or more media items, the one or more segments, or a combination thereof to the device, the one or more other devices, or a combination thereof associated with the one or more identities. In one scenario, the identities may include identities of the respective owners (or users) of the device and/or the other devices. If, for instance, a particular owner of one identified device is represented in a certain set of media items, the set of media items may automatically be shared to the identified device based on the determined identity of the owner. In another scenario, the identified device may automatically send a request for respective media items in which its owner is represented, for instance, upon the determination that its owner is represented in the media items (e.g., based on its generated recognition information).

In another embodiment, the collaborative recognition platform 103 may cause a notification of the device, the one or more other devices, or a combination thereof associated with the one or more identities that the one or more media items, the one or more segments, or a combination thereof are available. By way of example, after the identities of users and/or objects represented in the media items are determined, a notification may be transmitted to the devices (e.g., the device and/or the other devices) associated with the identities to indicate to users of the devices that the media items and/or the segments are ready for downloading. In one use case, the media items and/or the segments may be uploaded to a media database (e.g., the media database 109). The transmitted notification may provide the users of the devices with one or more links as well as any necessary codes to access media items and/or segments associated with identities of the respective devices. In this way, a particular device associated with a certain identity may download the media items and/or segments associated with the identity from the media database. In a further scenario, a shared online album or media collection may be generated based on the one or more identities. The creation of the shared online album or media collection may be initiated automatically, for instance, upon determining the one or more identities, or when respective media items are requested by users associated with the one or more identities. For example, if a user requests a particular photograph in which the user appears in, a shared album that includes at least the requested photograph may be created for the requesting user as well as for other users who appear in the requested photograph.

In another embodiment, the collaborative recognition platform 103 may cause an aggregation of the recognition information from the one or more other devices to determine voting information, quorum information, or a combination thereof, wherein the one or more identities are determined based on the voting information, the quorum information, or a combination thereof. In one scenario, the recognition information from each of the other devices may indicate identities for users, objects, etc., represented in the media items. The identity indications from one of the other devices may, however, be contrary to the identity indications from another one of the other devices.

As an example, users X and Y may be represented in a particular image. As part of a request for recognition information, face patches X and Y associated with users X and Y may be segmented from the image, and the segments may be transmitted to paired devices (e.g., based on a previously linking of the devices) within a predetermined proximity of the capturing device when the image was captured. A first and a second paired device may respond to the request with recognition information indicating that face patch X corresponds to user X and face patch Y corresponds to user Y. Nonetheless, a third paired device may indicate that face patch X corresponds to user X and face patch Y corresponds to user Z. The collaborative recognition platform 103 may count the number of "votes" casted by the pair devices (e.g., three "votes" for face patch X to user X, two "votes" for face patch Y to user Y, and one "vote" for face patch Y to user Z) to determine the identities of the users (e.g., users X and Y) represented in the image. In this example, the collaborative recognition platform 130 may utilize the identity with the most "votes" for each of the face patches to determine the identities of the users in the image (e.g., face patch X corresponds to user X and face patch Y corresponds to user Y).

As another example, the collaborative recognition platform 103 may additionally, or alternatively, treat a quorum of "votes" as a significant likelihood that certain identities are associated with users represented in the image. For purposes of illustration, a predetermined quorum threshold may be set at a third of the "votes." Based on the above example with respect to users X, Y, and Z, the collaborative recognition platform 103 may determine that user X is represented in the image. As such, the image (in its complete form) may be transmitted to user X based on the identity determination. Moreover, the collaborative recognition platform 103 may determine that there is a significant likelihood that either users Y or Z are represented in the image since a quorum of the paired devices indicated that user Y is represented in the image and a quorum of the paired devices indicated that user Z is represented in the image. As a result, the image may also be transmitted to both users Y and Z based on the quorum determination.

In another embodiment, the collaborative recognition platform 103 may determine whether to transmit the one or more media items in the request as one or more complete items or as the one or more segments based on resource availability information, device capability information, or a combination thereof. By way of example, the collaborative recognition platform 103 may compute the amount of data to be transferred and processed, determine the capabilities of the device and the other devices, and calculate current and projected available device and network resources. In one use case, current resource availability may be determined to be high and a selected device (e.g., one of the one or more other devices) may be determined to have the capability to efficiently generate recognition information from complete media items (e.g., able to effectively segment face patches from media items for comparison). As such, the recognition information request may include a particular media item as a complete item (e.g., rather than as segments of the media item) when transmitted to the selected device for determining recognition information since network resource availability may be lower at a later time and the selected device is able to efficiently produce recognition information from complete media items. In this way, upon a determination that the media item should be distributed to the selected device (e.g., if a user of the selected device is determined to be represented in the media item), the media item may simply be saved to the selected device (e.g., from a temporary folder, cache, etc., of the other device) without having to transmit the media item to the other device over a potentially slower network connection (e.g., due to a later non-availability or overutilization of network resources). It is noted, however, that privacy concerns may also be taken into account when determining whether to transmit complete media items as part of the request. For example, transmission of complete media items as part of a recognition information request may be restricted to selected devices that are identified by the collaborative recognition platform 103 as "trusted" devices.

In another embodiment, the one or more other devices may include one or more servers of at least one network service, at least one network application, or a combination thereof. In a further embodiment, the collaborative recognition platform 103 may cause a posting of the one or more media items, the one or more segments, or a combination thereof to one or more accounts of the at least one network service, at least one network application, or a combination thereof, wherein the one or more accounts are associated with the one or more identities. In one scenario, the recognition information request may be transmitted to servers of a particular social networking service (e.g., of the services 115). The social networking service may process segments of media items in the request to provide recognition information in response to the request. Based on a subsequent determination of the identities of users or objects represented in the media items, the social networking service may then post the media items to respective user accounts, of the social networking service, corresponding to the identities. In this way, media items may be efficiently distributed and shared to users associated with the identities represented in the media items.

By way of example, the UE 101, the collaborative recognition platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
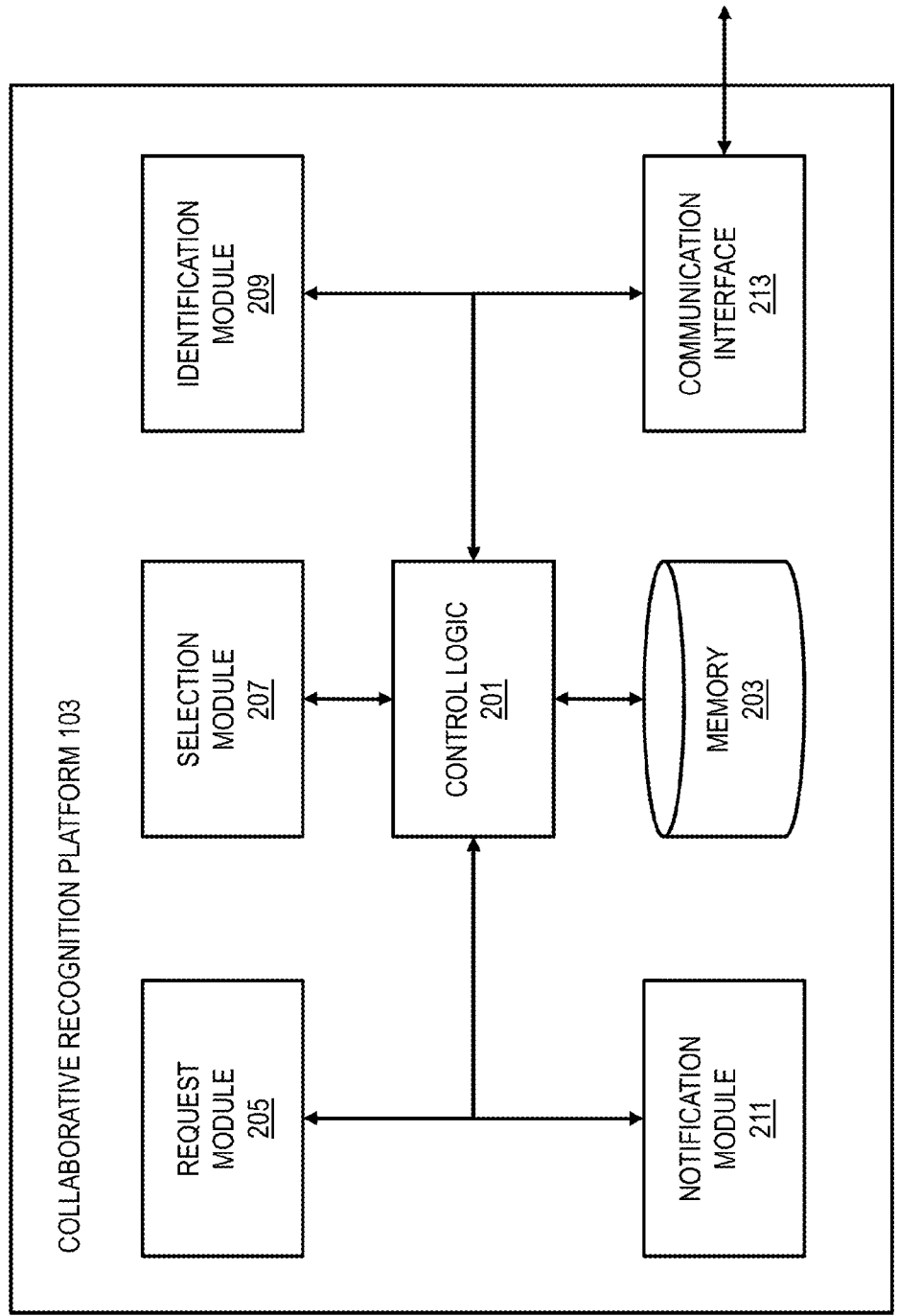
FIG. 2 is a diagram of the components of a collaborative recognition platform, according to one embodiment.

FIG. 2 is a diagram of the components of a collaborative recognition platform, according to one embodiment. By way of example, the collaborative recognition platform 103 includes one or more components for providing collaborative recognition using media segments. It is contemplated that the functions of these components may be combined in one or more components or performed by other components of equivalent functionality. In this embodiment, the collaborative recognition platform 103 includes control logic 201, memory 203, a request module 205, a selection module 207, an identification module 209, a notification module 211, and a communication interface 213.

The control logic 201 executes at least one algorithm for executing functions of the collaborative recognition platform 103. For example, the control logic 201 may interact with the request module 205 to generate a request to determine recognition information for media items (or segments of the media items) associated with a device. The request module 205 may work with the selection module 207 to select other devices to receive the request. The selection of the other devices may, for instance, be based on a number of device selection criteria, which may include proximity information, pairing information, and/or social networking information. The request module 205 may then transmit the request to the selected devices.

As mentioned, the selected devices may generate the recognition information using recognition models available at respective ones of the selected devices. Although each of the selected devices may not recognize every user or object represented in the media items, the respective ones of the selected devices are likely to recognize at least its own owner. Each selected device may, for instance, have recognition models created for the particular selected device to recognize its owner. Thus, in some embodiments, the recognition models may be private to the respective ones of the selected devices, represent owners of the respective ones of the selected devices, etc. After the recognition information is generated by the selected devices, the recognition information may be sent to the request module 205.

The request module 205 may handle the recognition information from the selected devices by aggregating the recognition information, and thereafter provide the aggregated recognition information to the identification module 209. The control logic 201 may then direct the identification module 209 to process the aggregated recognition information to determine identities of users, objects, etc., represented in the media items. As indicated, in one scenario, the identification module 209 may determine the identities by utilizing the aggregated recognition information to determine voting information, quorum information, etc. The aggregated recognition information may, for instance, indicate "votes" by the selected devices as to the identities of the users, the objects, etc., represented in the media items. The "votes" may be used to determine the likely accuracy of the indicated identities provided in the recognition information by the selected devices. For example, an indicated identity with the most number of "votes" for each user or object represented in a media item may be determined as the identity for the particular user or object.

The control logic 201 may also utilize the notification module 211 to generate notifications at the respective devices (e.g., the device or the selected devices) associated with the identities that the media items or the segments are available. As discussed, the generated notifications may include links along with necessary codes to access the media items or the segments. The control logic 201 may additionally utilize the communication interface 213 to communicate with other components of the collaborative recognition platform 103, the UEs 101, the service platform 113, the content providers 117, and other components of the system 100. For example, the communication interface 213 may assist with delivery of the request to the selected devices, transmission of instructions to the respective devices associated with the identities to generate the notifications, etc. The communication interface 213 may further include multiple means of communication. In one use case, the communication interface 213 may be able to communicate over short message service (SMS), multimedia messaging service (MMS), internet protocol, instant messaging, voice sessions (e.g., via a phone network), or other types of communication.

Figure 3:
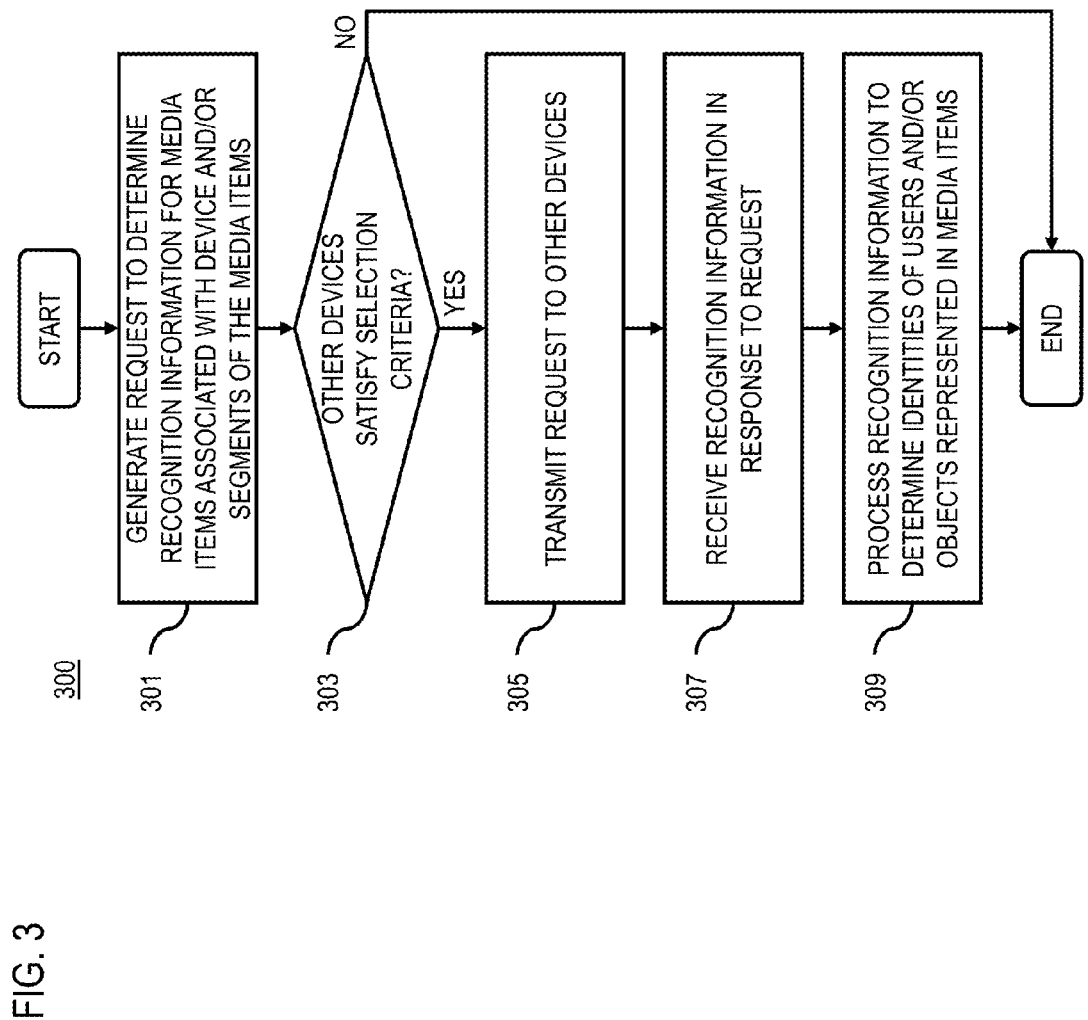
FIG. 3 is a flowchart of a process for providing collaborative recognition using media segments, according to one embodiment.
Figure 9:
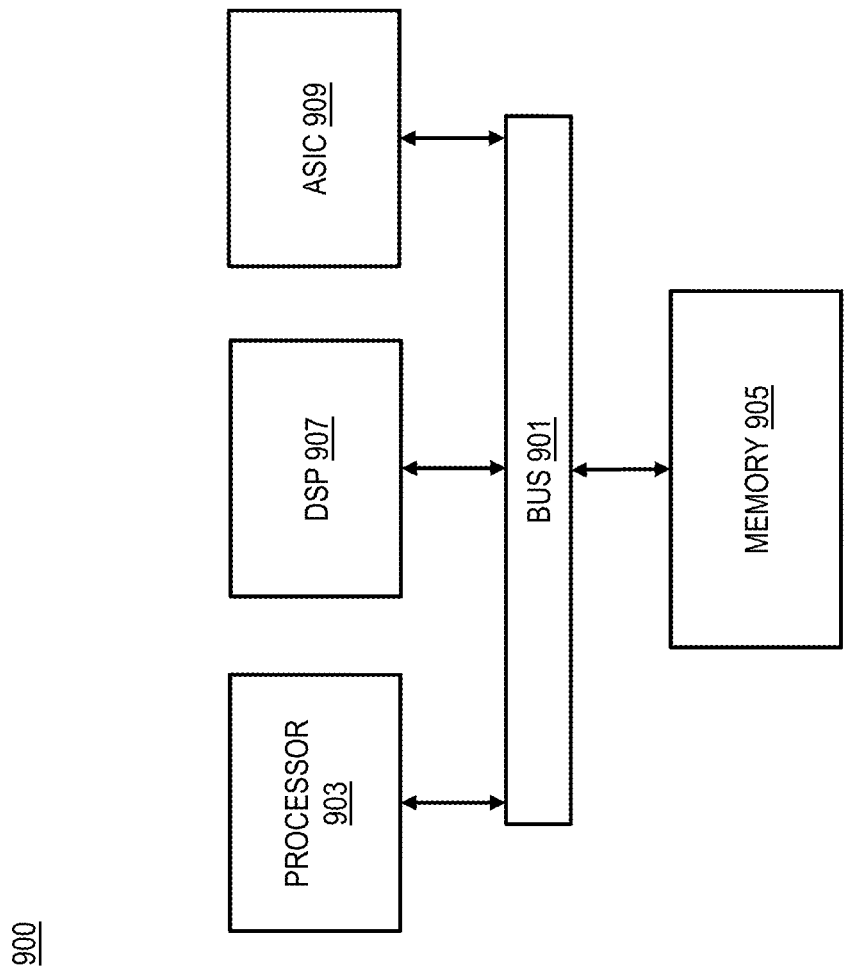
FIG. 9 is a diagram of a chip set that can be used to implement an embodiment of the invention.

FIG. 3 is a flowchart of a process for providing collaborative recognition using media segments, according to one embodiment. In one embodiment, the collaborative recognition platform 103 performs the process 300 and is implemented in, for instance, a chip set including a processor and a memory as shown in FIG. 9. As such, the control logic 201 can provide means for accomplishing various parts of the process 300 as well as means for accomplishing other processes in conjunction with other components of the collaborative recognition platform 103.

In step 301, the control logic 201 may cause, at least in part, a generation of a request to determine recognition information for one or more media items associated with a device, one or more segments of the one or more media items, or a combination thereof. In one scenario, the request may, for instance, include the one or more segments in place of the one or more media items. As mentioned, using segments of media items, rather than the complete media items, as part of the request for transmission to various devices for recognition processing may improve network bandwidth efficiency, especially when network resources are low or being utilized by other services, applications, devices, etc. Moreover, using the segments in place of the media items may also help preserve privacy with respect to those represented in the media items since the complete media items (and all the information represented in the media items) are not being distributed in the request for recognition information.

To determine one or more other devices to receive the request, the control logic 201 may, as in step 303, determine whether there are one or more other devices that satisfy one or more device selection criteria. As discussed, the one or more device selection criteria may include, at least in part, proximity information, pairing information, social networking information, or a combination thereof. By way of example, proximity information may include the proximity of the one or more other devices to a capturing device (e.g., the device) when the one or more media items were captured, the proximity of users of the one or more other devices to identified users in the one or more media items (e.g., proximity to the "home" location of the identified users), etc. Pairing information may include a previous or current linking of the one or more other devices with each other, with the device, etc. Social networking information may include connections or associations between the device and the one or more other devices and/or users of the device and the one or more other devices with respect to a social networking service, application, etc.

Accordingly, in step 305, the control logic 201 may determine to transmit the request to the one or more other devices based, at least in part, on the one or more device selection criteria. Upon receiving the request, the one or more other devices may generate the recognition information using one or more recognition models available at respective ones of the one or more other devices. As noted, it is recognized that each of the one or more other devices may not include all of the recognition models necessary to identify all users or objects in every media item. Nonetheless, it is likely that each of the one or more other devices will be able to identify at least its owner in media items in which its owner is represented, for instance, based on recognition models created for the respective ones of the one or more devices. As such, in some embodiments, the one or more recognition models are private to the respective ones of the one or more other devices, represent one or more owners of the respective ones of the one or more other devices, or a combination thereof. Once generated, the one or more other devices may send their generated recognition information to the collaborative recognition platform 103. As such, in step 307, the control logic 201 may receive the recognition information in response to the request. Then, in step 309, the control logic 201 may process and/or facilitate a processing of the recognition information to determine one or more identities of one or more users, one or more objects, or a combination thereof represented in the one or more media items.

Figure 4:
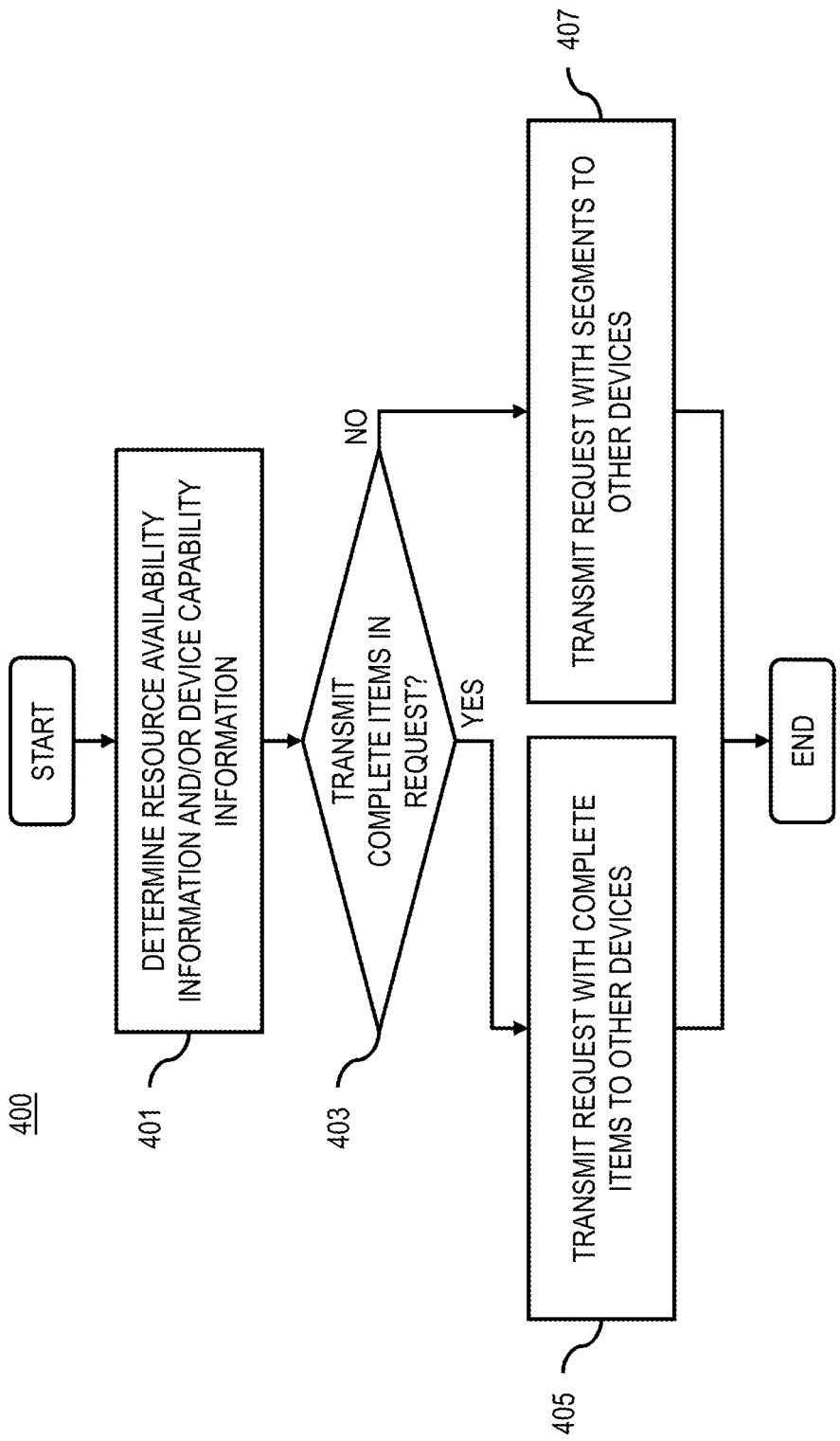
FIG. 4 is a flowchart of a process for transmitting requests for collaborative recognition, according to one embodiment.

FIG. 4 is a flowchart of a process for transmitting requests for collaborative recognition, according to one embodiment. In one embodiment, the collaborative recognition platform 103 performs the process 400 and is implemented in, for instance, a chip set including a processor and a memory as shown in FIG. 9. As such, the control logic 201 can provide means for accomplishing various parts of the process 400 as well as means for accomplishing other processes in conjunction with other components of the collaborative recognition platform 103.

In step 401, the control logic 201 may determine resource availability information, device capability information, or a combination thereof. By way of example, resource availability information may include processing, power, memory, bandwidth, etc., of the device, the one or more other devices, one or more networks, etc. Device capability information may include information relating to the capabilities of the device, the one or more other devices, etc.

In step 403, the control logic 201 may determine whether to transmit the one or more media items in the request as one or more complete items. In one scenario, this determination may be based on the resource availability information, the device capability information, or a combination thereof. If, for instance, the resource availability information are determined to satisfy a predetermined underutilization threshold, an availability threshold, etc., and/or the one or more other devices are determined to meet sufficient capabilities (e.g., ability to efficiently identify users in complete media items), the control logic 201 may, as in step 405, determine to transmit the request with the one or more complete items to the one or more other devices. Otherwise, the control logic 201 may, as in step 407, determine to transmit the request with the one or more segments to the one or more other devices.

Figure 5:
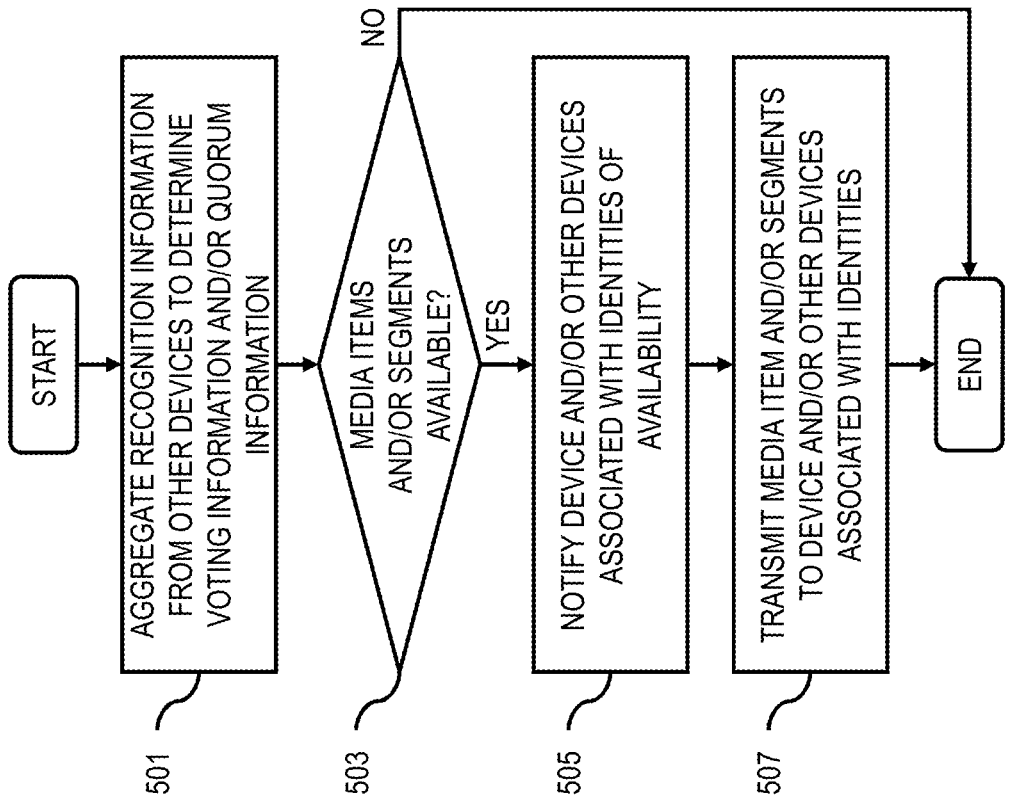
FIG. 5 is a flowchart of a process for distributing media items to devices associated with determined identities, according to one embodiment.

FIG. 5 is a flowchart of a process for distributing media items to devices associated with determined identities, according to one embodiment. In one embodiment, the collaborative recognition platform 103 performs the process 500 and is implemented in, for instance, a chip set including a processor and a memory as shown in FIG. 9. As such, the control logic 201 can provide means for accomplishing various parts of the process 500 as well as means for accomplishing other processes in conjunction with other components of the collaborative recognition platform 103.

In step 501, the control logic 201 may cause, at least in part, an aggregation of the recognition information from the one or more other devices to determine voting information, quorum information, or a combination thereof, wherein the one or more identities are determined based, at least in part, on the voting information, the quorum information, or a combination thereof. As indicated, in one use case, the aggregated recognition information may indicate "votes" by the other devices as to the identities of the users, the objects, etc., represented in the media items. The "votes" may be used to determine the likely accuracy of the indicated identities provided in the recognition information by the other devices. An indicated identity, for instance, with the most number of "votes" for each user or object represented in a media item may be determined as the identity for the particular user or object.

In step 503, the control logic 201 may determine whether the one or more media items, the one or more segments, or a combination thereof are available. If, for instance, the one or more media items, the one or more segments, or a combination thereof are available, the control logic 201, as in step 505, may cause, at least in part, a notification of the device, the one or more other devices, or a combination thereof associated with the one or more identities that the one or more media items, the one or more segments, or a combination thereof are available. By way of example, the notification may be an alert for the device, the other devices, users of the device and/or the other devices, etc., associated with the identities. The alert may, for instance, cause the device and/or the other devices associated with the identities to send an automatic request to the collaborative recognition platform 103 for the media items in which the users of the device and/or the other devices are represented in. Thus, in step 507, the control logic 201 may cause, at least in part, a transmission of the one or more media items, the one or more segments, or a combination thereof to the device, the one or more other devices, or a combination thereof associated with the one or more identities.

Figure 6:
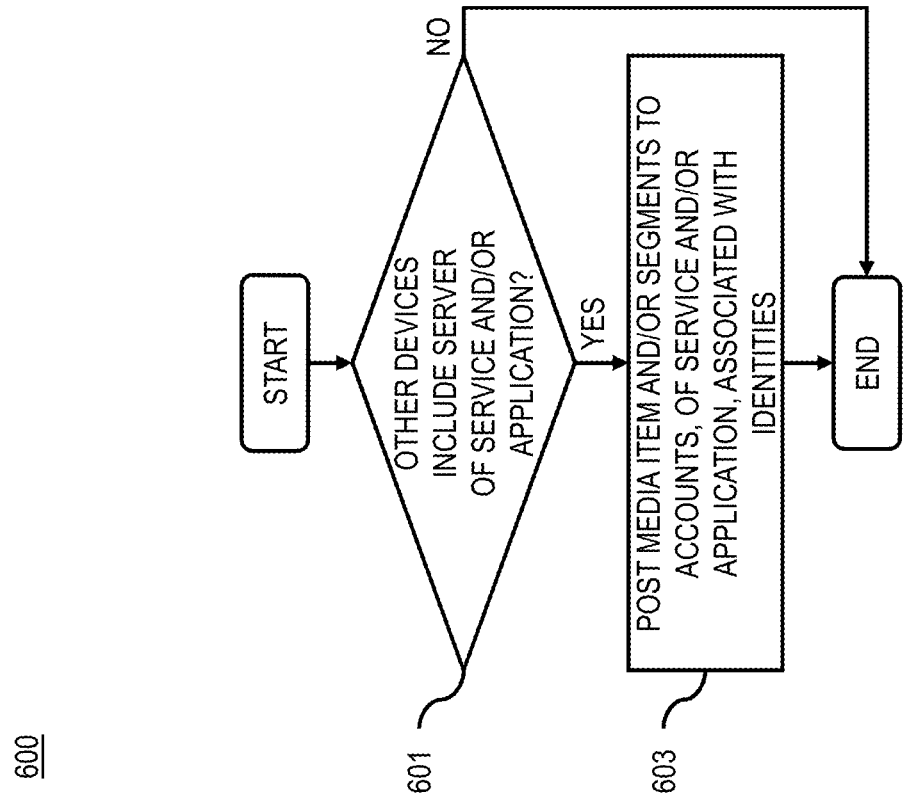
FIG. 6 is a flowchart of a process for posting media items to accounts, of network services and/or applications, associated with determined identities, according to one embodiment.

FIG. 6 is a flowchart of a process for posting media items to accounts, according to one embodiment. In one embodiment, the collaborative recognition platform 103 performs the process 600 and is implemented in, for instance, a chip set including a processor and a memory as shown in FIG. 9. As such, the control logic 201 can provide means for accomplishing various parts of the process 600 as well as means for accomplishing other processes in conjunction with other components of the collaborative recognition platform 103.

In step 601, the control logic 201 may determine whether the one or more devices include, at least in part, one or more servers of at least one network service, at least one network application, or a combination thereof. By way of example, the other devices may be determined to include servers associated with a social networking service (or application). As with non-server devices of the other devices, the servers of the social network service may receive a request, including segments of media items, to determine recognition information with respect to the media items. The servers may, for instance, determine that many of the identities represented in the segments provided in the request correspond to many of the accounts of the social networking service. As such, in addition to responding to the recognition information request with the recognition information generated by the servers, the social networking service may also request the media items in which users associated with the identities are represented as well as permission to post the media items to respective accounts corresponding to the identities.

Accordingly, if, for instance, the one or more devices are determine to include the one or more servers of the at least one network service, the at least one network application, or a combination thereof, the control logic 201 may, as in step 603, cause, at least in part, a posting of the one or more media items, the one or more segments, or a combination thereof to one or more accounts of the at least one network service, at least one network application, or a combination thereof, wherein the one or more accounts are associated with the one or more identities.

Figure 7A:
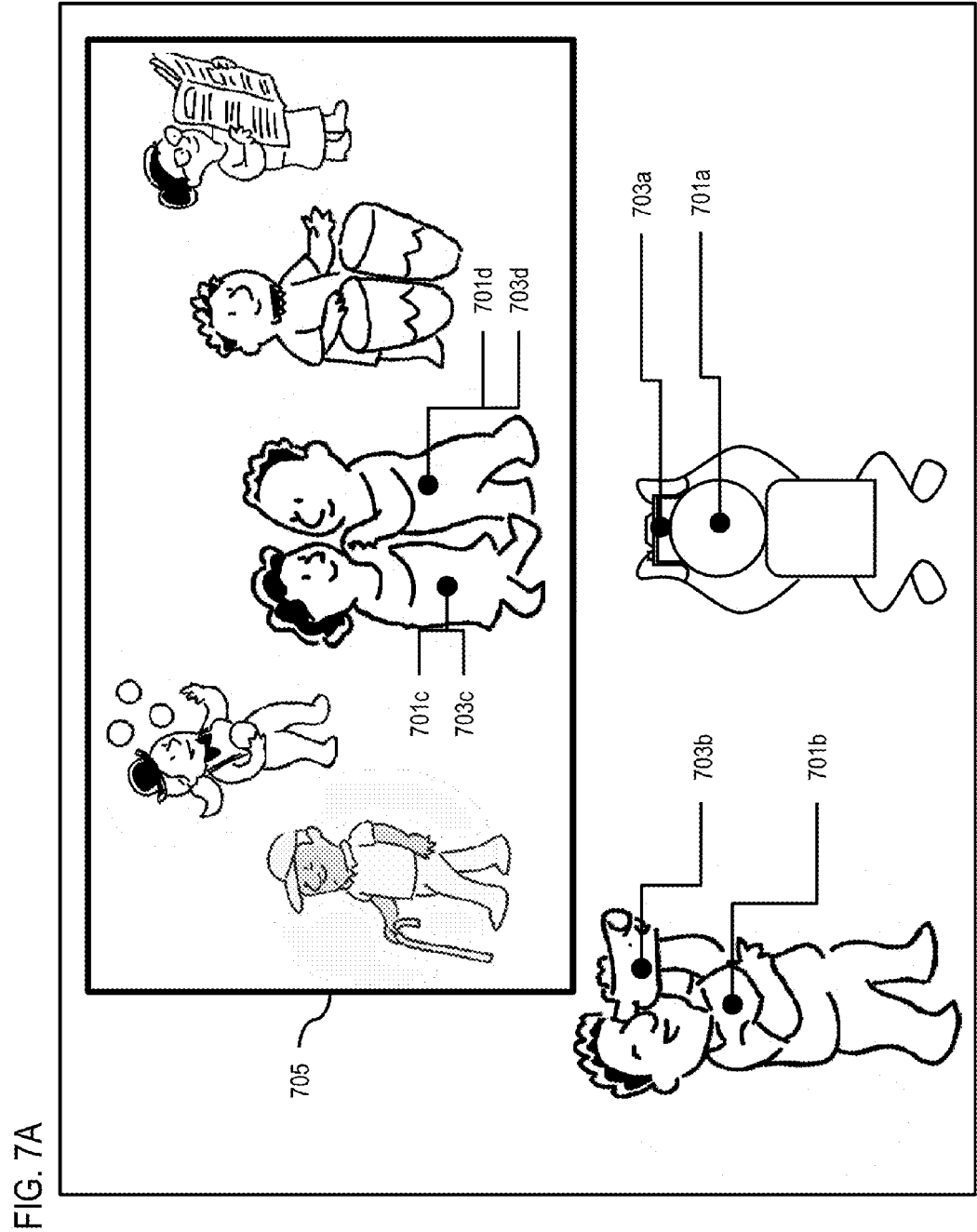
FIGS. 7A-7D are diagrams of collaborative recognition and distribution, according to various embodiments.

FIGS. 7A-7D are diagrams of collaborative recognition and distribution, according to various embodiments. FIG. 7A features users 701a-701d along with several other users at or around an outdoor event. Each of the users 701a-701d are respectively associated with mobile devices 703a-703d (e.g., users 701a-701d are respective owners of the mobile devices 703a-703d). In this scenario, users 701a and 701b are holding their mobile devices 703a and 703b while users 701c and 701d have their mobile devices 703c and 703d in their respective pockets. In addition, user 701a is currently taking a photograph 705 of the users 701c and 701d along with other users at or around the outdoor event.

Figure 7B:
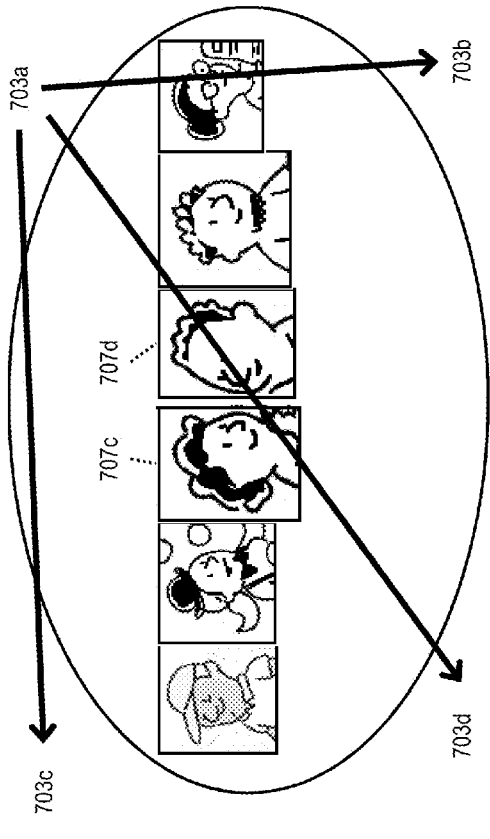

As illustrated in FIG. 7B, the mobile device 703a is transmitting a request to the mobile devices 703b-703d to determine recognition information for the photograph 705 (e.g., taken in FIG. 7A). As part of the request, the segments 707c and 707d as well as other segments of the photograph 705 are sent to the mobile devices 703b-703d for processing of the request. As indicated, the mobile devices 703b-703d may have been selected to receive the request based on a number of device selection criteria, which may include proximity information (e.g., near the mobile device 703a at the time the photograph 705 was taken), pairing information (e.g., previously linking of the mobile devices 703a-703d), and/or social networking information (e.g., associated with mobile device 703a's social networking group).

Figure 7C:
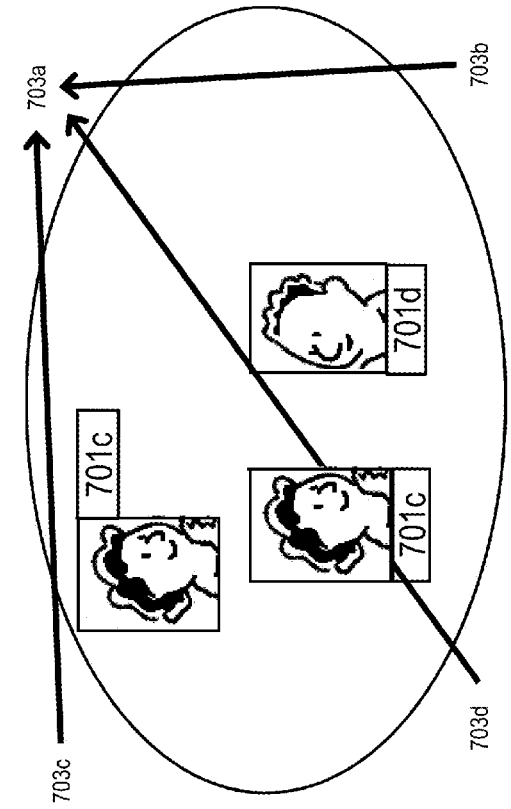
Figure 7D:
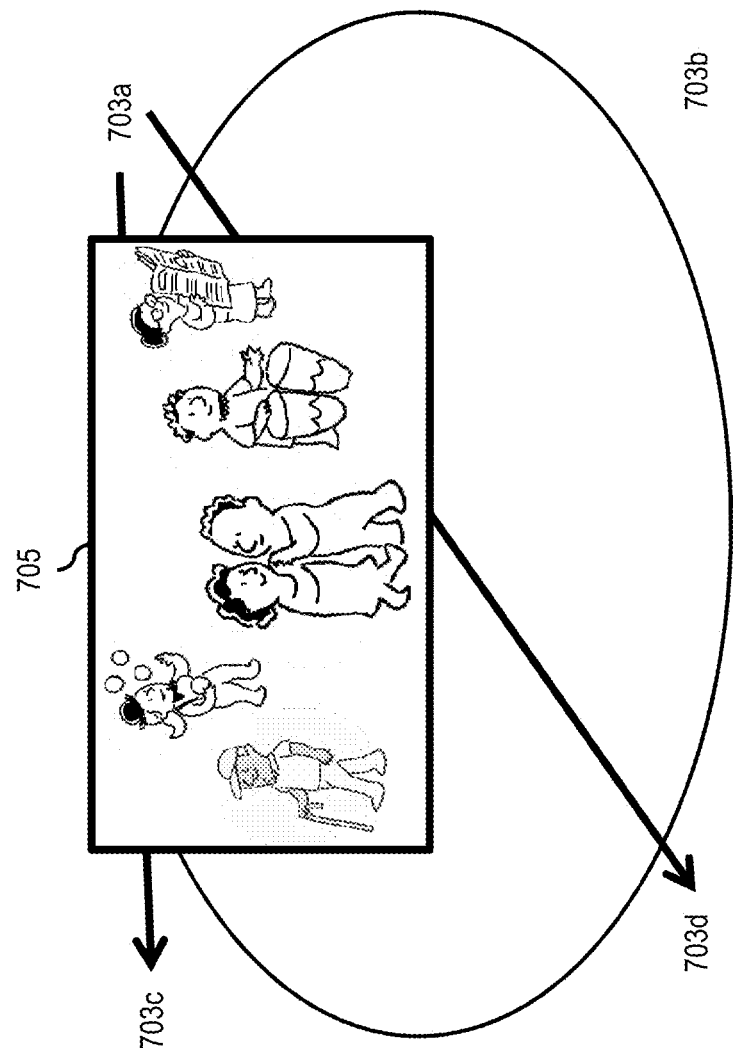

As shown in FIG. 7C, the mobile devices 703b-703d are responding to the request by transmitting their generated recognition information to the mobile device 703a. For example, mobile device 703b has indicated that it does not recognize any of the users represented in the segments. On the other hand, mobile device 703c has indicated that segment 707c represents user 701c, and mobile device 703d has indicated that segment 707c and 707d respectively represent 701c and 701d. As demonstrated in FIG. 7D, the mobile device 703a is able to determine the identities of at least users 701c and 701d based on the indications of the recognition information provided by the mobile devices 703b-703d. Subsequently, the mobile device 703 transmits the photograph 705 to the mobile devices 703c and 703d since the mobile devices 703c and 703d are associated with the identities of the users (e.g., users 701c and 701d) represented in the photographs 705. It is noted that the transmission of the request, the photograph 705, the recognition information, etc., by the mobile devices 703a-703d to one another may be direct transmissions (e.g., via Bluetooth, near-field communications (NFC), WiFi, other peer-to-peer capabilities), transmissions via one or more servers, transmission over one or more networking services, etc.

The processes described herein for providing collaborative recognition using media segments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
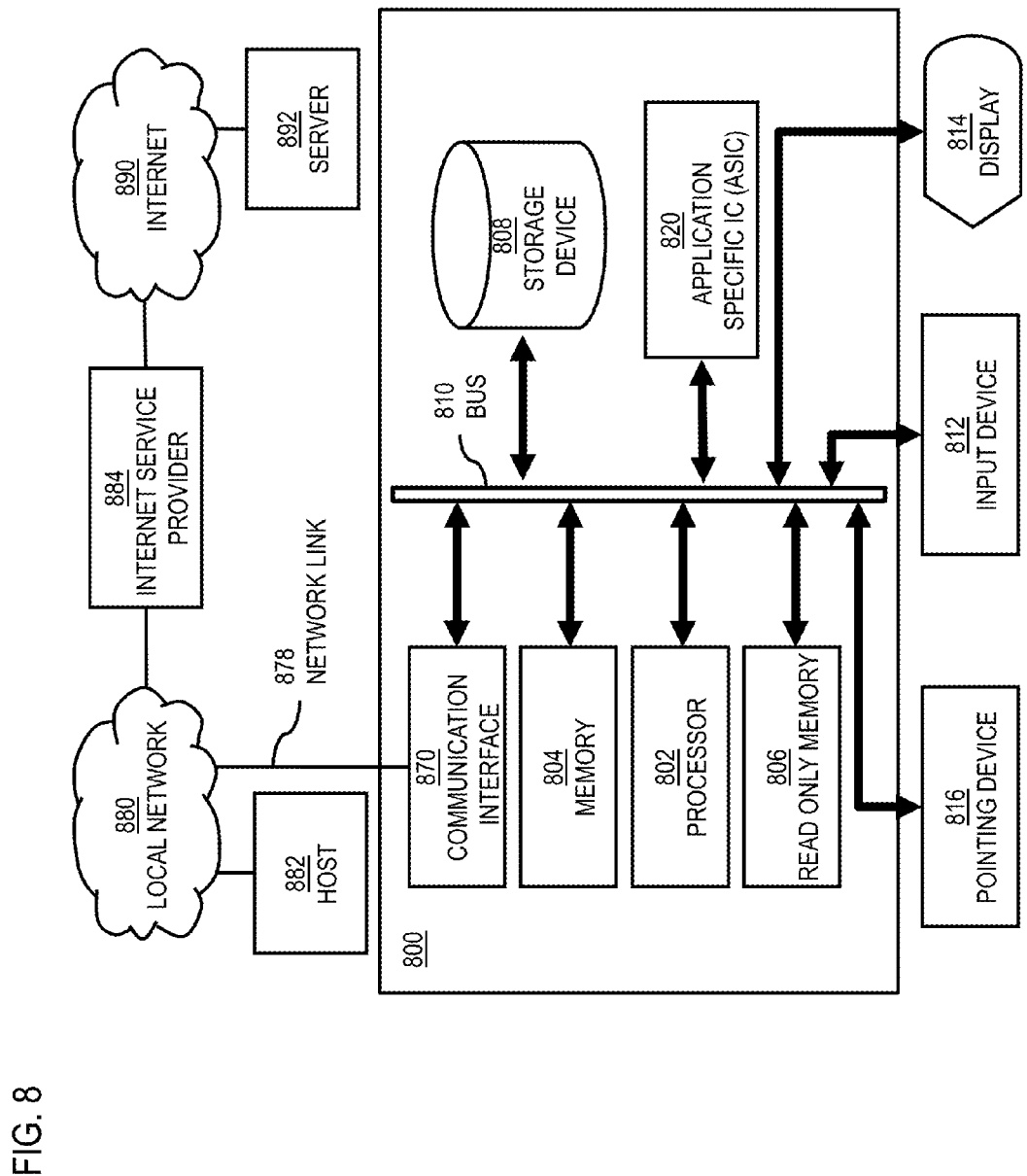
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide collaborative recognition using media segments as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing collaborative recognition using media segments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing collaborative recognition using media segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing collaborative recognition using media segments. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing collaborative recognition using media segments, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing collaborative recognition using media segments to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide collaborative recognition using media segments as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing collaborative recognition using media segments.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide collaborative recognition using media segments. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing collaborative recognition using media segments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing collaborative recognition using media segments. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011.

The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide collaborative recognition using media segments. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method facilitating a processing of or processing (1) data or (2) information or (3) at least one signal, the (1) data or (2) information or (3) at least one signal based, at least in part, on the following:
    a generation of a request to determine recognition information for one or more media items associated with a device, one or more segments of the one or more media items, or a combination thereof;
    at least one determination to transmit the request to one or more other devices based, at least in part, on one or more device selection criteria, wherein the device selection criteria is based, at least in part, on the one or more other devices user privacy settings;
    receipt of the recognition information in response to the request;
    a transmission of the recognition information to a networking service; and receipt of one or more identities of one or more users represented in the one or more media items, wherein the one or more identities are determined based, at least in part, on the networking service's recognition models of the one or more users, recognition models of social networking friends of the one or more users, or a combination thereof.

2. A method of claim 1, wherein the one or more device selection criteria include social networking information, proximity information, pairing information or a combination thereof.

3. A method of claim 1, wherein the (1) data or (2) information or (3) at least one signal are further based, at least in part, on the following:
a transmission of the one or more media items, the one or more segments, or a combination thereof to the device, the one or more other devices, or a combination thereof associated with the one or more identities.

4. A method of claim 1, wherein the (1) data or (2) information or (3) at least one signal are further based, at least in part, on the following:
a notification of the device, the one or more other devices, or a combination thereof associated with the one or more identities that the one or more media items, the one or more segments, or a combination thereof are available.

5. A method of claim 1, wherein the recognition information is generated at the one or more other devices using one or more recognition models available at respective ones of the one or more other devices.

6. A method of claim 5, wherein the one or more recognition models are private to the respective ones of the one or more other devices, represent one or more owners of the respective ones of the one or more other devices, or a combination thereof.

7. A method of claim 1, wherein the (1) data or (2) information or (3) at least one signal are further based, at least in part, on the following:
at least one determination of whether to transmit the one or more media items in the request as one or more complete items or as the one or more segments based, at least in part, on resource availability information, device capability information, or a combination thereof.

8. A method of claim 1, wherein the one or more other devices include, at least in part, one or more servers of at least one network service, at least one network application, or a combination thereof, and wherein the (1) data or (2) information or (3) at least one signal are further based, at least in part, on the following:
a posting of the one or more media items, the one or more segments, or a combination thereof to one or more accounts of the at least one network service, at least one network application, or a combination thereof,
wherein the one or more accounts are associated with the one or more identities.

9. A method of claim 1, wherein the one or more media items include, at least in part, one or more images, one or more videos, one or more audio samples, one or more biometric samples, or a combination thereof, and wherein the recognition information is determined based, at least in part, on facial recognition technology, audio recognition technology, biometric recognition technology, or a combination thereof.

10. An apparatus comprising:
at least one processor; and
at least one memory including computer program code for one or more programs,
the at least one memory and the computer program code configured to, with the at least one processor, cause the apparatus to perform at least the following,
cause, at least in part, a generation of a request to determine recognition information for one or more media items associated with a device, one or more segments of the one or more media items, or a combination thereof;
determine to transmit the request to one or more other devices based, at least in part, on one or more device selection criteria, wherein the device selection criteria is based, at least in part, on the one or more other devices user privacy settings;
receive the recognition information in response to the request;
transmit the recognition information to a networking service; and
receive one or more identities of one or more users represented in the one or more media items,
wherein the one or more identities are determined based, at least in part, on the networking service's recognition models of the one or more users, recognition models of social networking friends of the one or more users, or a combination thereof.

11. An apparatus of claim 10, wherein the one or more device selection criteria include social networking information, proximity information, pairing information, or a combination thereof.

12. An apparatus of claim 10, wherein the apparatus is further caused to:
cause, at least in part, a transmission of the one or more media items, the one or more segments, or a combination thereof to the device, the one or more other devices, or a combination thereof associated with the one or more identities.

13. An apparatus of claim 10, wherein the apparatus is further caused to:
cause, at least in part, a notification of the device, the one or more other devices, or a combination thereof associated with the one or more identities that the one or more media items, the one or more segments, or a combination thereof are available.

14. An apparatus of claim 10, wherein the recognition information is generated at the one or more other devices using one or more recognition models available at respective ones of the one or more other devices.

15. An apparatus of claim 14, wherein the one or more recognition models are private to the respective ones of the one or more other devices, represent one or more owners of the respective ones of the one or more other devices, or a combination thereof.

16. An apparatus of claim 10, wherein the apparatus is further caused to:
determine whether to transmit the one or more media items in the request as one or more complete items or as the one or more segments based, at least in part, on resource availability information, device capability information, or a combination thereof.

17. An apparatus of claim 10, wherein the one or more other devices include, at least in part, one or more servers of at least one network service, at least one network application, or a combination thereof, and wherein the apparatus is further caused to:
cause, at least in part, a posting of the one or more media items, the one or more segments, or a combination thereof to one or more accounts of the at least one network service, at least one network application, or a combination thereof,
wherein the one or more accounts are associated with the one or more identities.

18. An apparatus of claim 10, wherein the one or more media items include, at least in part, one or more images, one or more videos, one or more audio samples, one or more biometric samples, or a combination thereof, and wherein the recognition information is determined based, at least in part, on facial recognition technology, audio recognition technology, biometric recognition technology, or a combination thereof.

19. A method of claim 1, wherein the (1) data or (2) information or (3) at least one signal are further based, at least in part, on the following:
   an aggregation of the recognition information from the one or more other devices to determine voting information, quorum information, or a combination thereof; and
   a processing of the recognition information to determine one or more identities of one or more users, one or more objects, or a combination thereof represented in the one or more media items.

20. An apparatus of claim 10, wherein the apparatus is further caused to:
   aggregate the recognition information from the one or more other devices to determine voting information, quorum information, or a combination thereof; and
   process or facilitate a processing of the recognition information to determine one or more identities of one or more users, one or more objects, or a combination thereof represented in the one or more media items.

* * * * *